United States Patent [19]

Podgorski

[11] 4,152,071

[45] May 1, 1979

[54] CONTROL APPARATUS

[75] Inventor: Theodore J. Podgorski, St. Paul, Minn.

[73] Assignee: Honeywell Inc., Minneapolis, Minn.

[21] Appl. No.: 710,526

[22] Filed: Aug. 2, 1976

[51] Int. Cl.² .................................................. G01B 9/02

[52] U.S. Cl. .................................................. 356/350

[58] Field of Search .................................. 356/106 LR

[56] References Cited

U.S. PATENT DOCUMENTS

| | | | |
|---|---|---|---|
| 3,467,472 | 9/1969 | Killpatrick | 331/DIG. 1 |
| 3,612,690 | 10/1971 | Staats | 356/106 LR |
| 3,697,181 | 10/1972 | Macek et al. | 356/106 LR |
| 3,721,497 | 3/1973 | Shutt et al. | 356/106 LR |
| 3,743,969 | 7/1973 | Hutchings | 356/106 LR X |
| 3,846,025 | 11/1974 | Wilber | 356/106 LR |

*Primary Examiner*—Paul A. Sacher
*Assistant Examiner*—Matthew W. Koren
*Attorney, Agent, or Firm*—Roger W. Jensen

[57] ABSTRACT

Apparatus to minimize laser angular rate sensor lock in by optimal positioning of the beam path within the laser cavity.

12 Claims, 9 Drawing Figures

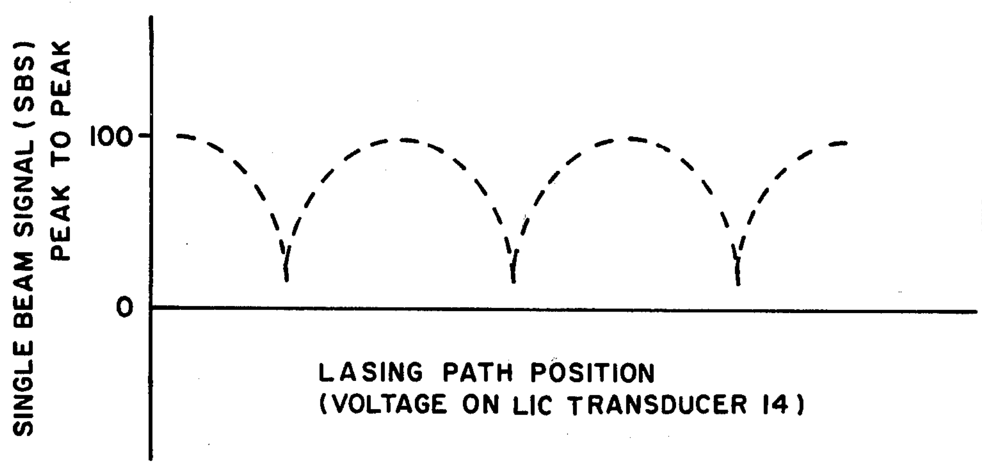
FIG. 2A
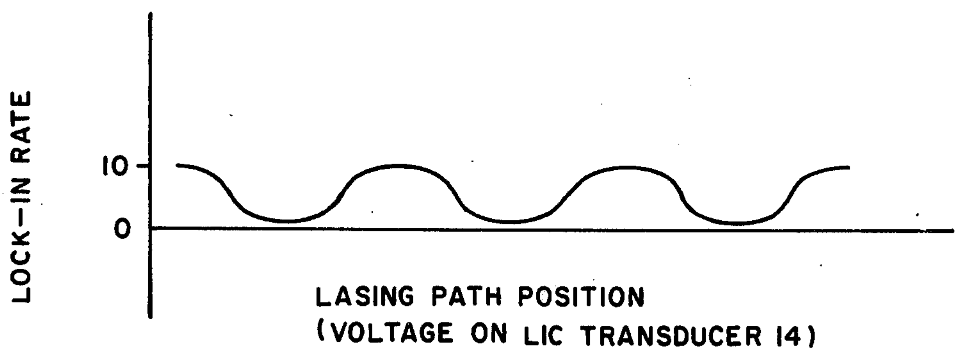
FIG. 2B
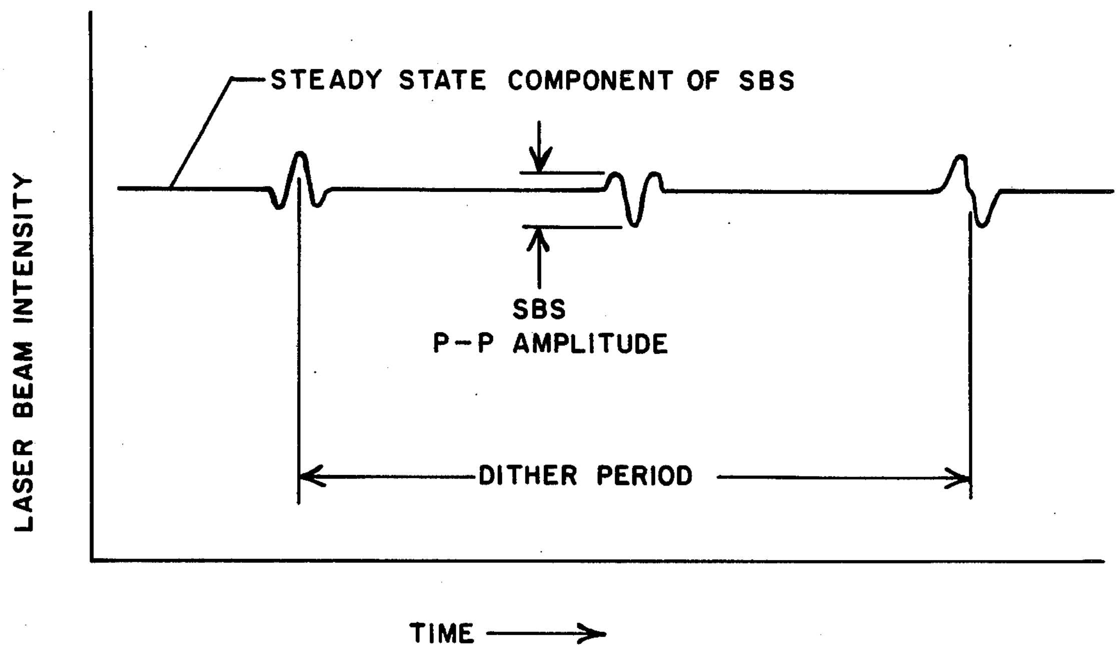
FIG. 3 SINGLE BEAM SIGNAL OF A DITHERED GYRO FIG. 4
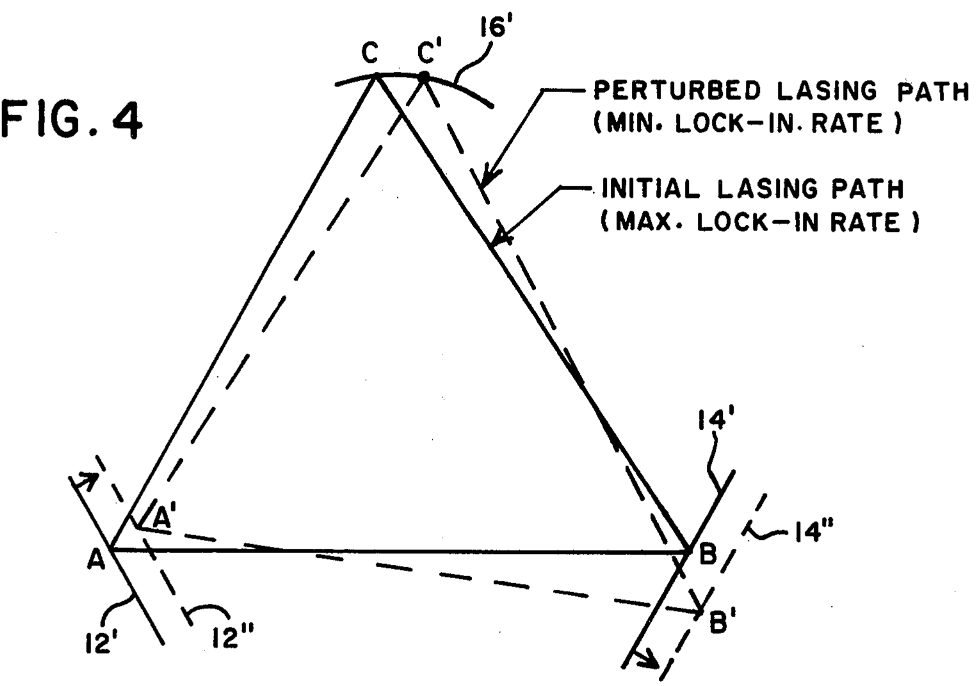
FIG. 5 INITIAL SCATTERING VECTOR SUM (MAX. $\Omega_{LI}$)
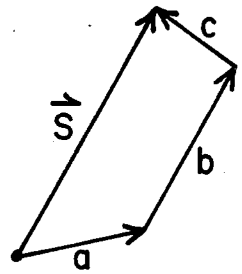
FIG. 6 PERTURBED SCATTERING VECTOR SUM (MIN. $\Omega_{LI}$)
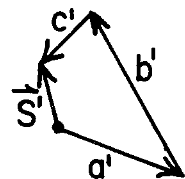

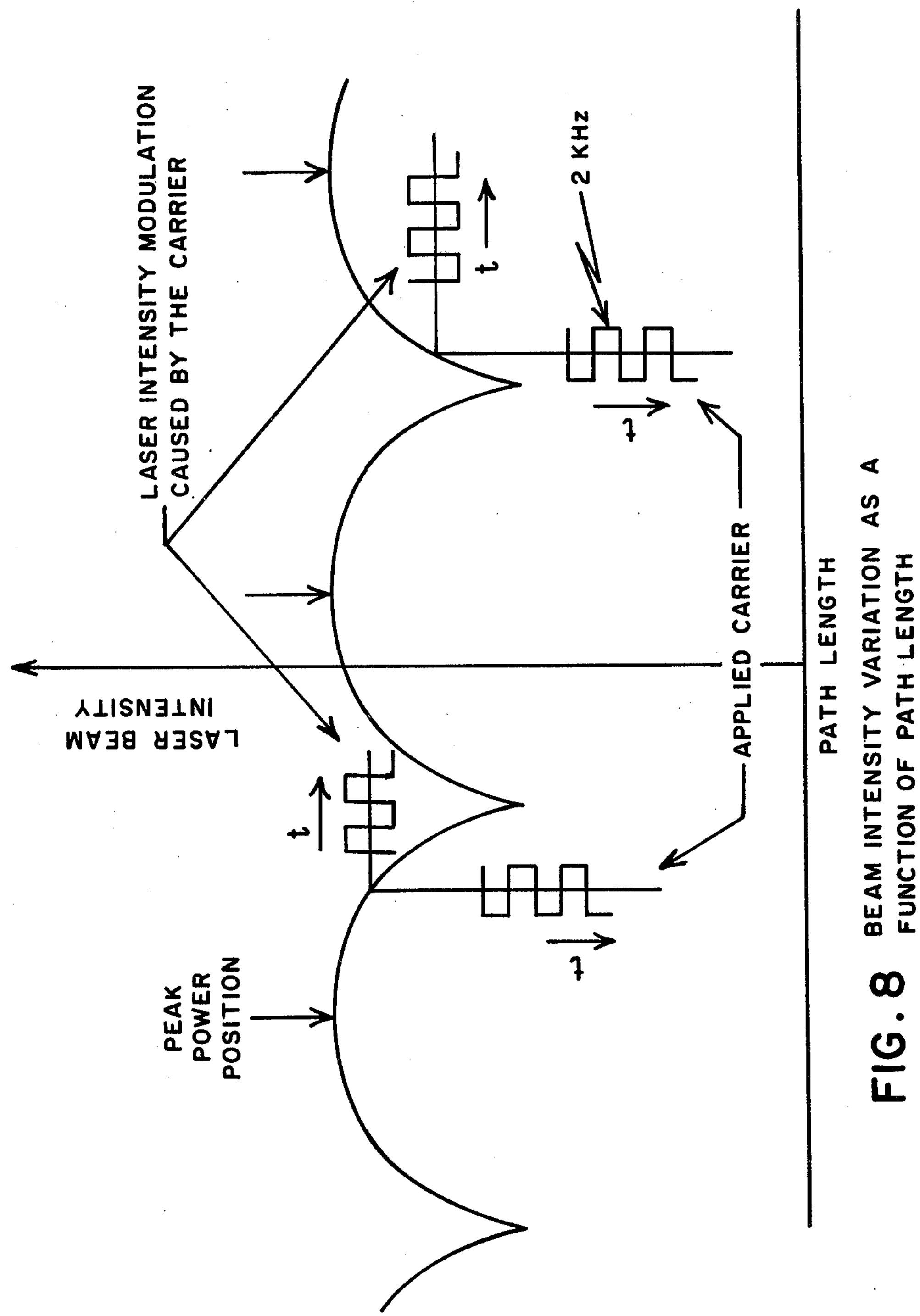
FIG. 8 BEAM INTENSITY VARIATION AS A FUNCTION OF PATH LENGTH

CONTROL APPARATUS

BACKGROUND OF THE INVENTION

In a laser gyroscope, or laser angular rate sensor (LARS), a pair of laser light beams (monochromatic radiation produced or generated by gas discharge) travel about a closed loop path. The two beams, traveling in opposite directions around the loop, are compared in frequency. When the system of which the LARS is a component is at rest in inertial space, then the two beams oscillate at the same or substantially the same frequency since they see equal path lengths. If the system rotates in inertial space, the two oppositely traveling beams see unequal paths, oscillate at different frequencies, and this frequency difference may be measured as an indication of the direction and amount of rotation. A typical means for measuring the frequency difference is the optical interferometer fringe pattern measuring technique well known to those skilled in the art. It is also well known that for small rotation rates of the entire system, the two beams are inclined to resonate together and "lock-in". In the prior art several arrangements have been proposed to reduce this lock-in phenomenon. An example is U.S. Pat. No. 3,373,650 granted Mar. 19, 1968 in the name of J. E. Killpatrick and assigned to the same assignee as the present intention. This patent teaches electrical and/or mechanical oscillation or biasing or "dithering" of the LARS with respect to inertial space so that the LARS seem to be rotating at a rate higher than the lock-in rate . . . at least for a majority of the time. This invention was further enhanced by the invention disclosed in U.S. Pat. No. 3,467,472 also granted in the name of J. E. Killpatrick and assigned to the same assignee as the present invention; the teaching of this invention further reducing the lock-in error by randomizing the oscillation or biasing or dithering of the beams so that the small errors in the extremities of the oscillation are no longer cumulative.

It has been recognized, however, that notwithstanding the significant benefits derived from utilizing the teachings of the two mentioned prior art U.S. Pat. Nos. 3,373,650 and 3,467,472, there nevertheless still remain certain errors known by those skilled in the art as a random drift rate or random walk type error. The present invention is a significant improvement over prior art techniques and specifically greatly reduces the random walk type error in a LARS.

Scattering of light from one of the beams of the laser angular rate sensor into the other (oppositely directed) beam is considered to be the source of lock-in. Defects in the mirrors are considered to be the primary sources of such scattered light. Present LARS have a wide variation in their lock-in values . . . a 10:1 variation in the lock-in rate for one model of a LARS is not atypical. In order to achieve consistent and minimal lock-in values, it is presently necessary to use very costly manufacturing techniques which take the form of attempting to obtain nearly perfect ultralow scatter mirrors and a certain amount of trial and error in matching mirrors and laser cavities. These expensive manufacturing techniques are most undesirable and have been an obstacle in the path of the utilization of LARS in various systems applications.

SUMMARY OF THE INVENTION

I have discovered that the lock-in for any given laser angular rate sensor can be reduced to the minimum value by moving the position of the entire lasing path relative to the laser block geometry. My discovery further includes a means for automatically moving the lasing path to the optimum position through a servo network comprising in part a pair of transducer mirrors both of which have the common function of being reflective surfaces for defining the lasing path. The first transducer mirror (hereinafter sometimes referred to as a Path Length Control or PLC transducer mirror) is controlled to maintain a constant path length which provides peak laser output power. The second transducer mirror (hereinafter sometimes referred to as a Lock-In Control or LIC transducer mirror) is controlled as a function of the intensity of one of the laser beams; more specifically, it is controlled to respond to the amplitude of the alternating modulation of such beam intensity, the servo network automatically controlling the LIC transducer so that the lasing path is shifted to and maintained at a position which produces a minimum single beam signal (hereinafter sometimes referred to as SBS); i.e., a minimum of the amplitude of such alternating beam intensity.

The variation in the amplitude of the intensity of the separate or individual laser beams is not to be confused with the very high optical frequency of oscillation of the individual laser beams, the difference in frequency of which is used in the aforementioned prior art interferometer techniques for measurement of rate of rotation of the entire system about the system input axis. Nor is the variation in the amplitude of the intensity of the individual laser beam to be confused with the steady state intensity of the beam. Prior art techniques have been provided for maximizing the laser beam intensity by optimal path length control; the present invention utilizes such optimal path length control in conjunction with means for simultaneously minimizing the alternating or periodic variations in the amplitude of the beam intensity.

DESCRIPTION OF THE DRAWINGS

In the drawings:

In FIG. 1 the clockwise (CW) beam is shown in dashed form and the counterclockwise (CCW) beam is shown in solid form; laser beam intensity is plotted on the vertical axis and LARS system rate of rotation about the input axis is depicted on the horizontal axis, CW rotation being depicted to the right and CCW rotation to the left;

FIG. 2 is divided into FIGS. 2A and 2B both having a common horizontal axis indicative of the lasing path position. FIG. 2A depicts variations of the single beam signal intensity (measured on a peak to peak basis) and FIG. 2B depicts lock-in rate;

FIG. 3 is a graph which shows a variation in laser beam intensity (plotted on the vertical axis) as a function of time plotted on the horizontal axis;

FIG. 4 is a schematic showing a lasing path ABC which is representative of an initial lasing path in a non-optimum orientation. FIG. 4 further shows a shifted or perturbed lasing path A'B'C' which is representative of an optimum, i.e., minimum lock-in rate, position;

FIGS. 5 and 6 are vector diagrams showing the vector addition of the scattered light for FIG. 4 laser paths ABC and A'B'C' respectively;

FIG. 8 is a graph showing laser beam intensity variation as a function of path length.

DETAILED DESCRIPTION

Figure 1:
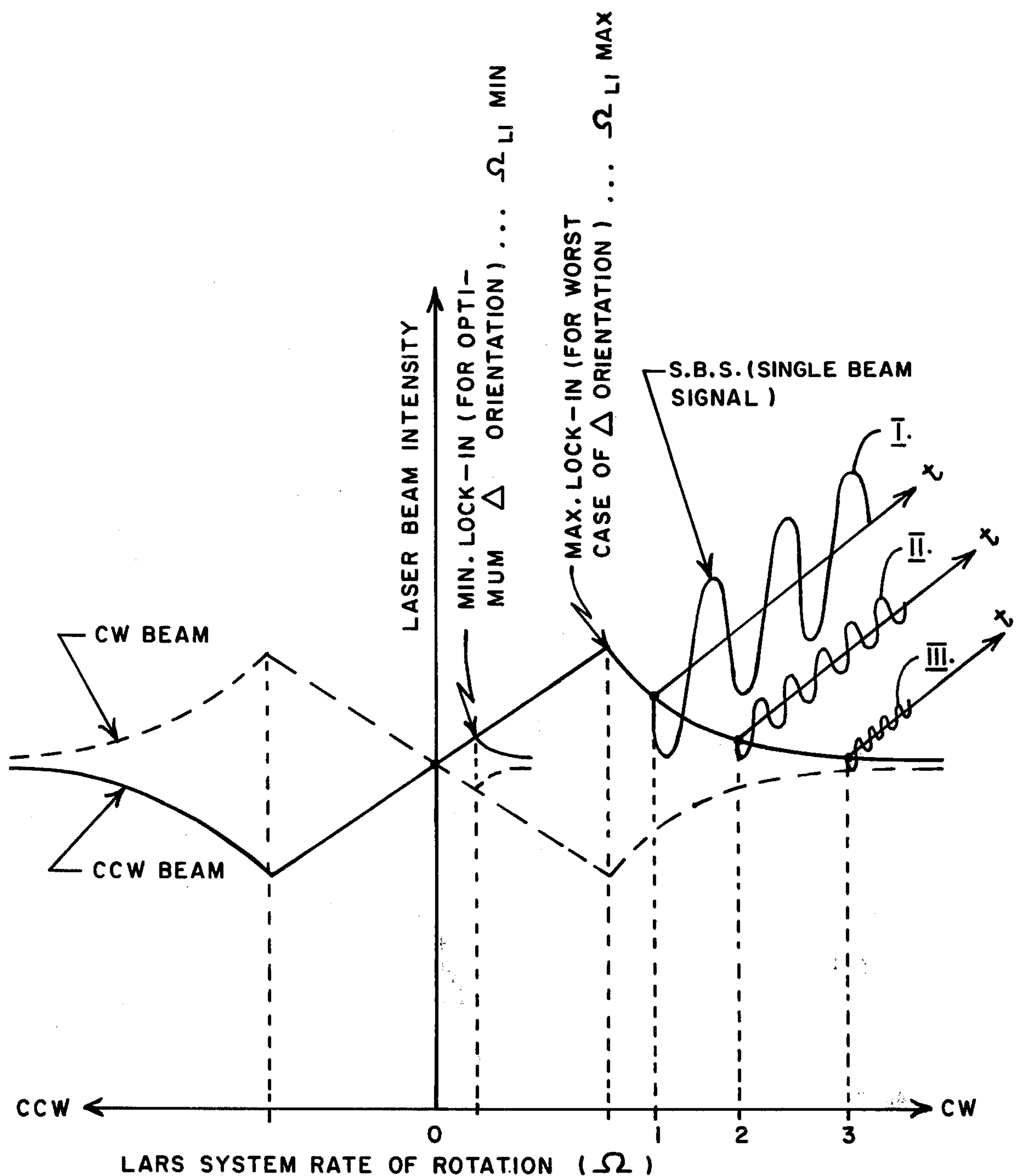
FIG. 1 is a graph showing, for a LARS apparatus, the variation in the intensity of the two oppositely traveling beams as a function of rate of rotation of the LARS about its sensitive or input axis.

Referring to FIG. 1, laser beam intensity is plotted on the vertical axis and LARS system rate of rotation about the input axis is depicted on the horizontal axis, CW rotation and CCW rotation being depicted respectively to the right and left of the midpoint or position of zero input rate. When the LARS is not rotating, the CW and CCW traveling beams have the same (steady state) intensity. This is also represented in FIG. 3 by the steady state component of the graph depicted thereon. As the LARS system starts to rotate, e.g., in a CW direction, the CW beam decreases in intensity while the CCW beam increases in intensity . . . this is sometimes referred to as the "winking" effect. This phenomena is accentuated up to the point where the lock-in rate is reached. In FIG. 1 the maximum lock-in rate is designated . . . this is the worst case for a given LARS and represents the worst possible combination of back scattered light. As a corollary in FIG. 1 the minimum lock-in rate is also designated. It will be noted that there is a substantial difference between the minimum and maximum lock-in rates.

Once the lock-in rate has been exceeded, then both beams will vary in intensity in a periodic or sinusoidal manner (the variation in intensity being further characterized by the variation of one beam being 180 degrees out of phase with the other). Further, the frequency of such modulation is the difference in frequency between the unlocked CW and CCW beams (just prior to lock-in) and the amplitude of such modulation is inversely dependent on the input rate of rotation applied to the entire LARS. The foregoing modulating characteristics are depicted in FIG. 1 by three sine waves I, II, and III showing the variation in the amplitude of the CCW beam (as a function of time (t) . . . the t axis being orthogonal to the plane of the paper of FIG. 1, i.e., the plane defined by the x and y axes) for the representative CW input rates 1, 2 and 3 respectively. Thus, it will be noted that the frequency of modulation increases progressively from signal I to signal II to signal III while the amplitude of such modulation decreases. The peak value of the aforedescribed AC ripple occurs just at lock-in, the higher the lock-in rate, the greater the amplitude. This is depicted in FIG. 2A where the peak to peak amplitude of the SBS is plotted on the vertical axis as a function of the lasing path position. As indicated, FIG. 2B shows the variation in lock-in rate plotted on the vertical axis as a function for the same lasing path position. It is therefore seen that for a given LARS the lock-in rate will periodically vary between a maximum and a minimum . . . the example depicted in FIG. 2B being roughly in the ratio of 10:1. Importantly, it will be noted that the peak-to-peak magnitude of the SBS is at a maximum at the maximun lock-in rate; conversely, the SBS signal is at a minimum for the minimum lock-in rate. It is this phenomena that I utilize in my invention for adjusting the lasing path to the optimum position; i.e., the lasing path is adjusted to that position which produces the minimum SBS signal which then will result in the LARS having the minimum value of lock-in rate.

Referring to FIG. 3, total laser beam intensity of a single beam is depicted on the vertical axis, the beam intensity having a steady state level superimposed on which is the periodic sinusoidal variation as the rotationally dithered gyro is moved back and forth through the lock-in rate. In FIG. 3 a period of time corresponding to the dithering period or one complete dither cycle has been depicted. During a complete dither cycle there are two separate sinusoidal variations of the SBS . . . in FIG. 3 the dither period is shown as being measured from the midpoint of one of the sinusoidal variations to the midpoint of the second next following sinusoidal variation.

Figure 7:
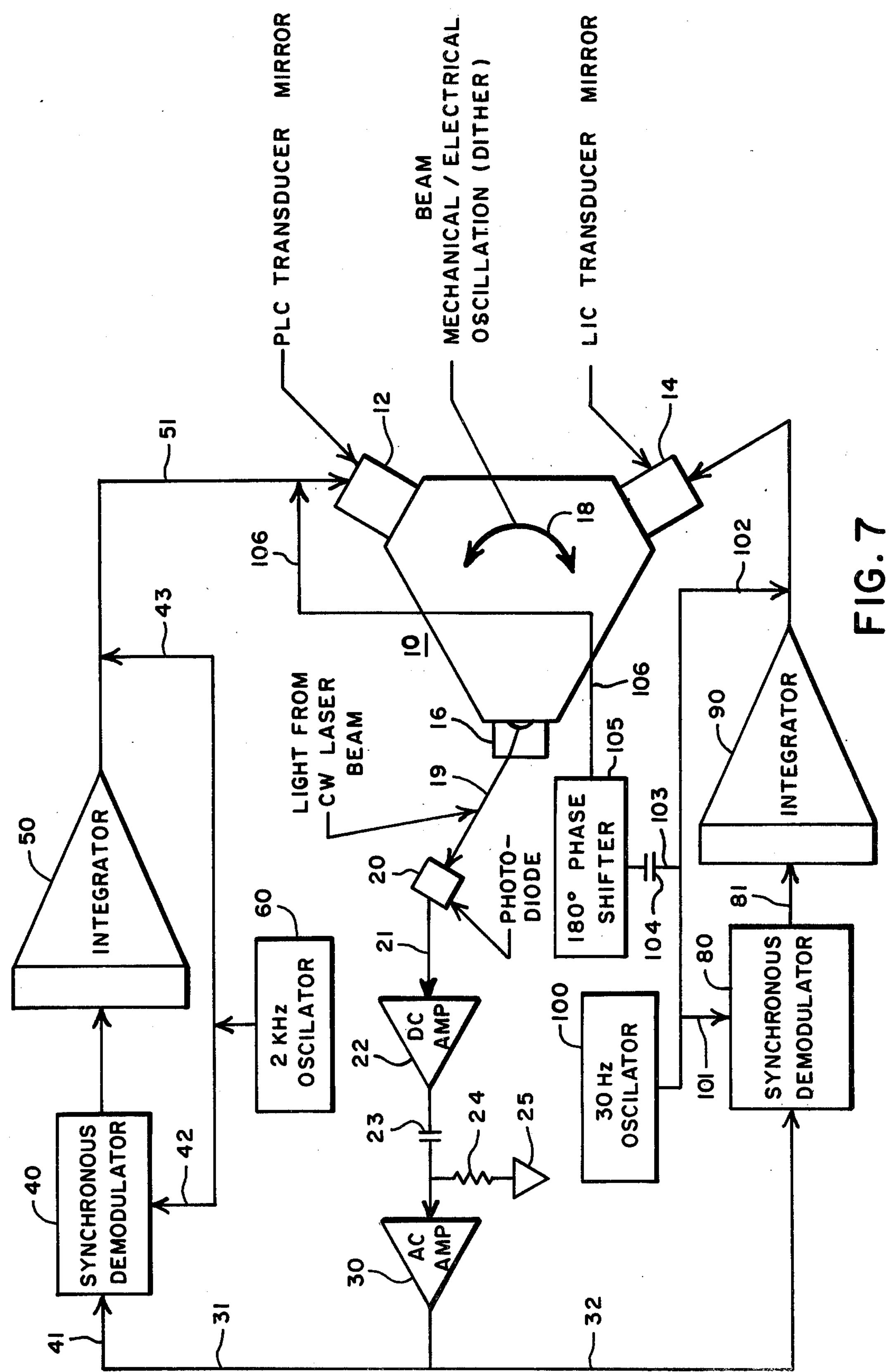
FIG. 7 is a block diagram of a preferred embodiment of my invention.

Referring now to FIG. 7, a complete system is shown somewhat in schematic form, comprising a LARS generally depicted by reference numeral 10 which may comprise a solid quartz block LARS similar to that shown in the U.S. Pat. No. 3,390,606 granted July 2, 1968 in the name of Theodore J. Podgorski and assigned to the same assignee as the present invention. The LARS 10 of FIG. 7 is further characterized by having a pair of transducers similar to transducer 24 depicted in U.S. Pat. No. 3,581,227 granted May 25, 1971, also in the name of Theodore J. Podgorski and assigned to the same assignee as the present invention. A third mirror 16 which preferably has a curved concave inwardly extending surface is provided, mirrors 12, 14 and 16 collectively defining a triangular lasing path A-B-C shown schematically in FIG. 4. Briefly, transducer mirrors 12 and 14 have mirror surfaces 12′ and 14′ (shown schematically in FIG. 4) which are adapted to be moved in and out along axes perpendicular to the surfaces thereof as a function of the electrical energization applied to the control element thereof as is more fully taught in said U.S. Pat. No. 3,581,227.

Transducer mirror 12 is also designated as the path length control (PLC) transducer and transducer mirror 14 is also identified as the Lock In Control (LIC) transducer.

It is to be understood that the entire LARS 10 is to be periodically rotated or dithered according to the aforementioned U.S. Pat. Nos. 3,373,650 and/or 3,467,472 so that the LARS is periodically or sequentially or repeatedly rotated through a zero input rate. This dithering is represented in FIG. 7 by directional arc 18, such dithering causing the LARS to periodically go in and out of lock-in, the resulting sinusoidal variations in the intensity of a single beam being, as indicated above, depicted in FIG. 3.

Path Length Control Loop

The purpose of the path length control loop is to adjust the distance that the laser beams travel around the lasing triangle so that such distance results in an optical frequency of oscillation resulting in maximum laser output power. Such path length control means is broadly taught in the aforementioned U.S. Pat. No. 3,581,227. The path length is changed by applying a voltage of the proper magnitude to the PLC transducer mirror 12. In FIG. 7 the PLC loop comprises, in addition to the PLC transducer mirror 12, a photo diode 20, a DC amplifier 22, an AC amplifier 30, a synchronous demodulator 40, an integrator 50 and an oscilator 60. In FIG. 7, light from a clockwise laser beam impinges upon the photo diode 20; this beam (reference numeral 19) is derived from the main CW laser beam within the cavity and is emitted through the curved mirror 16 which permits the passage of some light. The photo diode is a means which responds to periodic variations in the intensity of the light beam to produce an electrical output as at 21 which is applied to the DC amplifier 22. The output of amplifier 22 is applied to a capacitor 23 connected through a resistor 24 to a ground or zero potential reference 25. The junction between the capacitor 23 and resistor 24 is connected to the input of AC amplifier 30. The AC amplifier 30 thus has applied thereto a signal indicative of the periodic variations of the intensity of the CW beam; the amplifier 30 amplifies such signal and such amplified signal is applied through lead 31 to a first input of the synchronous demodulator 40 which also receives at a second input 42 thereof a reference signal from the oscillator 60. The function of the synchronous demodulator 40, the integrator 50 and the oscillator 60 is to vary the energization to the PLC transducer/mirror 12 so as to maintain the path length of the CW and CCW beams at an optimum length, i.e., so as to maintain peak steady state intensity/power (as is broadly taught in aforesaid U.S. Pat. No. 3,581,227), this being effected through a connection 51 between the output of the integrator 50 and the PLC transducer mirror 12 and by a connection 43 which, together with 51, couples the output from the oscillator 60 to the transducer 12. The oscillator 60 preferably has a relatively high frequency of oscillation, e.g., 2 KHz, which functions, through its direct application, i.e., leads 43 and 51, to transducer 12 to dither the path length control loop at a relatively fast or high rate to provide fast time response or to provide a fast correction for disturbances to the loop.

Thus, the PLC control loop functions to maximize the steady state component of the SBS (see FIG. 3) by any variations in such steady state component being coupled in the manner described above; e.g., via capacitor 23 so as to provide an output from the integrator 50 which, through 51, varies the average excitation to transducer 12 to hold total path length at the optimum point. FIG. 8 shows the variation in laser beam intensity as a function of path length; in this view the peak power positions are designated. Further, a pair of sample excitations to transducer 12 are show, the first to the right and the second on the left. In both cases the 2 KHz output from oscillator 60 is shown superimposed upon the output from the integrator 50 with the resulting effect on the servo loop being depicted. On a horizontal basis, it will be noted that the horizontal depictions are 180 degrees out of phase with one another. Those skilled in the art will recognize that FIG. 8 is descriptive of the function of the PLC servo loop.

Lock-In Control Loop

The output from AC amplifier 30 is also applied through a connection 32 to a lock-in control loop; the major components of which are a synchronous demodulator 80, an integrator 90 and an oscillator 100. The output of the synchronous demodulator 80 is connected through a means 81 to the integrator 90. The oscillator 100 oscillates at a relatively low frequency, e.g., 30 hertz, the output of 100 being applied (i) through 101 to synchronous demodulator 80, (ii) through 102 to LIC transducer mirror 14, and (iii) through 103, capacitor 104, 180 degree phase shifter 105, and lead 106 as another input to PLC transducer mirror 12. Phase shifter 105 provides the function of producing an output signal 180 degrees shifted from the input. The capacitor 104 permits the output of 100 to be applied to 105 but isolates phase shifter 105 from any steady state signals, e.g., the output from integrator 90. Thus the 30 hertz output from oscillator 100 is applied in a push-pull manner to PLC and LIC transducer mirrors 12 and 14. This effectively positionally dithers, i.e., oscillates, the lasing triangle A-B-C (see FIG. 4) within the lasing cavity at the dither frequency of 30 hertz and causes the intensity of the lasing beams to vary at that frequency. In addition, as indicated, the 30 hertz signal is applied to the synchronous demodulator 80 which also has applied thereto the output from amplifier 30. The output of the demodulator 80, in turn, is applied to integrator 90, the output of which is a signal the polarity (or sense) and magnitude of which are indicative respectively (i) of the phase of SBS signal (as compared to the reference frequency of 100) and (ii) the time integral of the magnitude of the SBS signal.

To summarize, the PLC and LIC transducer mirrors 12 and 14 are positionally dithered; and in addition, LIC transducer mirror 14 is energized by the output from integrator 90.

The function of the LIC loop as above described is to respond to the magnitude of the periodic variations in the SBS signal. The positional dither signal applied push-pull to 12 and 14 produces, as indicated, an oscillation in the lasing triangle relative to the lasing cavity and permits, as is understood by those skilled in the art, the servo loop to respond to the output of the integrator 90 to function to shift the average position of the lasing triangle to that position which causes the minimum amplitude SBS signal. By using the push-pull connections to 12 and 14 first order path length changes are eliminated. With reference to FIG. 4, the signal from integrator 90 as applied to 14 causes the shift of the surface 14′ of the transducer, this being in a direction which the servo loop commands so as to reduce the magnitude of the output of amplifier 30. The changed position of surface 14′ is designated in FIG. 4 as 14″. However, as soon as surface 14′ begins to shift, this causes a change in the path length for the beams which change is immediately sensed by the fast time response PLC control loop. This loop immediately functions to hold the path length constant, and this control is manifested by an immediate shifting of surface 12′ to a new position designated as 12″ in FIG. 4. It is thus seen that the entire lasing path or triangle A-B-C has been shifted to a new position A′B′C′.

As indicated above, the triangle A-B-C in FIG. 4 is representative of an initial lasing path for the two contrarotating beams of the LARS, it arbitrarily may be stated that this path is one that coincidentally produces or causes the maximum lock-in frequency, i.e., lock-in frequency is greatest . . . see worst case for CCW beam in FIG. 1. FIG. 5 shows the corresponding vector summation of the individual light scattering vectors a, b and c for the reflective surfaces 12′, 14′ and 16′ of the mirrors 12, 14 and 16 respectively. It is noted that the resultant S of the sum of the individual vectors a, b and c is quite large in magnitude.

Triangle A′B′C′ of FIG. 4 is representative of a loop orientation (measured with regard to the lasing cavity) which produces the minimum lock-in frequency. This is the orientation . . . sometimes referred to as the perturbed lasing path . . . which is the resultant of the functioning of my invention as per the operation of the apparatus shown in FIG. 7, i.e., with the PLC transducer being controlled by the PLC loop for maximizing the steady state intensity of the beams and with the LIC loop functioning to control the LIC transducer 14 as a function of the periodic varying component of the SBS, all as aforesaid. It will be noted that in FIG. 6 the individual vectors a′, b′, and c′ are of substantially the same magnitude as vectors a, b and c respectively . . . this being a recognition that the imperfections in the mirrored surfaces of 12, 14 and 16 are of about the same degree of severity throughout the length and breadth of the surfaces per se. However, in FIG. 6 it will be noted that the resultant S' is much smaller than the resultant S of FIG. 5; this is caused by the phasing of the individual vectors a', b' and c' as shown. The invention functions, therefore, to operate the PLC and LIC control loop simultaneously so as to seek out and find and hold a lasing path position within the lasing cavity, i.e., to minimize the periodic variations in the intensity of the beams . . . this in turn will minimize the magnitude of the resultant vector S' which is indicative of the fundamentally important fact that this also corresponds to the minimum lock-in frequency.

It will be thus appreciated that the present invention provides a way of assembling a LARS from standard piece parts and components recognizing that the individual mirrors have a certain average imperfection coefficient. The present invention, however, permits such mirrors to be used without trial and error substitution thereof and the resultant finally assembled LARS will all have the same or very substantially the same value of lock-in. In this manner, a uniform product can be manufactured, at a minimum cost, for use in the wide variety of systems employing LARS.

Those skilled in the art will recognize that numerous variations may be made in the utilization of my invention and that the invention accordingly should be limited only pursuant to the terms of the appended claims.

What I claim is:

1. Apparatus for minimizing lock-in in a laser angular rate sensor comprising a laser cavity around which a pair of laser beams travel in opposite directions along the same closed loop, means responsive to lock-in of said beams and producing a signal indicative of the magnitude of the lock-in frequency, beam loop shifting means connected to said signal producing means, and means controlling said beam loop shifting means to respond to said signal so as to cause said beam loops to be shifted within said cavity to a position at which the lock-in frequency is at a minimum.

2. Apparatus of claim 1 further characterized by said lock-in responsive means being means responsive to the periodic variations of the intensity of one of said beams.

3. Apparatus of claim 1 further characterized by said lock-in responsive means being means responsive to the magnitude of the periodic variations of the intensity of one of said beams.

4. Apparatus of claim 3 further characterized by said means controlling said beam loop shifting means functioning to cause said loop to be shifted to a position whereat the magnitude of said periodic variations is reduced to a minimum.

5. In a laser apparatus comprising a cavity having at least three reflective surfaces defining a polygonal closed loop and laser beam producing means for producing two contrarotating oscillating beams traveling in opposite directions around said loop, means for minimizing the lock-in frequency of oscillation of said two beams comprising:

first and second transducer means having reflective surfaces, said transducer means with their associated reflective surfaces defining two corners of said polygonal closed loop;

means for producing a signal indicative of the magnitude of the lock-in frequency; and means connecting said signal producing means to said first and second transducer means so as to energize said transducer means to shift said associated reflective surfaces in unison but in opposite senses so as to shift said closed loop within said cavity to a position at which the lock-in frequency is at a minimum.

6. Apparatus of claim 5 further characterized by one of said transducer means being controlled to adjust total path length of said beams about said polygonal closed loop so as to maintain the steady state intensity of said beams at a maximum.

7. In a laser apparatus comprising a cavity having at least three reflective surfaces defining a polygonal closed loop and laser beam producing means for producing two contrarotating oscillating beams traveling in opposite directions around said loop, means for minimizing the lock-in frequency of oscillation of said two beams comprising:

first and second transducer means having reflective surfaces, said transducer means with their associated reflective surfaces in combination with at least one additional reflective surface defining said polygonal closed loop;

means for controlling said first transducer means as a function of laser beam intensity so as to control total path length of said beams, said path length being maintained at a length at which maximum intensity/maximum power is produced; and means controlling said second transducer means as a function of the magnitude of the lock-in frequency of said beams, said transducers when so controlled functioning to (i) maintain said beams at peak power/intensity and (ii) shift the entire loop within said cavity to a position at which the lock-in frequency is at a minimum.

8. Apparatus of claim 7 further characterized by the means controlling said first transducer means having a response time which is substantially faster than the response time of the means controlling said second transducer means.

9. Apparatus of claim 8 further being characterized by said lock-in responsive means for controlling said second transducer means being responsive to the magnitude of the periodic variations in the intensity of one of said beams.

10. In a laser apparatus comprising a cavity having at least three reflective surfaces defining a polygonal closed loop and laser beam producing means for producing two contrarotating oscillating beams traveling in opposite directions around said loop, and means for periodically dithering the entire laser apparatus so that said beams periodically lock in, means for minimizing the lock-in frequency of oscillation of said two beams comprising:

first and second transducer means having reflective surfaces, said transducer means with their associated reflective surfaces in combination with at least one additional reflective surface defining said polygonal closed loop;

means for controlling said first transducer means as a function of laser beam intensity so as to control total path length of said beams, said path length being maintained at a length at which maximum intensity/maximum power is produced; and means controlling said second transducer means as a function of the magnitude of the lock-in frequency of said beams, said transducers when so controlled functioning to (i) maintain said beams at peak power/intensity and (ii) shift the entire loop within said cavity to a position at which the lock-in frequency is at a minimum.

11. Apparatus of claim 10 further characterized by the means controlling said first transducer means having a response time which is substantially faster than the response time of the means controlling said second transducer means.

12. Apparatus of claim 11 further being characterized by said lock-in responsive means for controlling said second transducer means being responsive to the magnitude of the periodic variations in the intensity of one of said beams.

* * * * *